(12) United States Patent
Hallikainen

(10) Patent No.: US 12,119,748 B2
(45) Date of Patent: Oct. 15, 2024

(54) SINGLE-INPUT MULTIPLE-OUTPUT DCDC CONVERTERS WITH SEQUENTIAL OUTPUTS

(71) Applicant: Nordic Semiconductor ASA, Trondheim (NO)

(72) Inventor: Samuli Hallikainen, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 141 days.

(21) Appl. No.: 17/500,629

(22) Filed: Oct. 13, 2021

(65) Prior Publication Data
US 2022/0115950 A1    Apr. 14, 2022

(30) Foreign Application Priority Data

Oct. 14, 2020    (GB) ..................................... 2016283

(51) Int. Cl.
  *H02M 3/158*    (2006.01)
  *H02M 1/00*     (2006.01)
  *H02M 3/157*    (2006.01)

(52) U.S. Cl.
  CPC ......... *H02M 3/1588* (2013.01); *H02M 1/009* (2021.05); *H02M 3/157* (2013.01)

(58) Field of Classification Search
  CPC ................... H02M 1/009; H02M 3/155–1588
  See application file for complete search history.

(56) References Cited

U.S. PATENT DOCUMENTS

| | | | |
|---|---|---|---|
| 2006/0221649 A1 | 10/2006 | Yamanaka et al. | |
| 2008/0231115 A1* | 9/2008 | Cho ................. | H02M 3/33561 |
| | | | 307/41 |
| 2012/0080945 A1 | 4/2012 | Vasadi et al. | |
| 2012/0286576 A1 | 11/2012 | Jing et al. | |
| 2013/0082673 A1 | 4/2013 | Sako | |
| 2015/0062108 A1 | 3/2015 | Archibald | |
| 2016/0379581 A1 | 12/2016 | Takenaka | |
| 2017/0093278 A1 | 3/2017 | Unno et al. | |

(Continued)

FOREIGN PATENT DOCUMENTS

| | | |
|---|---|---|
| EP | 2 622 723 B1 | 1/2019 |
| EP | 3432454 A1 | 1/2019 |
| JP | 2018074850 | 5/2018 |

OTHER PUBLICATIONS

Martinez et al., "Single-Input Dual-Output (SIDO) Linear-Assisted DC/DC Converter," XVI Annual Seminar on Automation, Industrial Electronics and Instrumentation, 2008, 6 pages.

(Continued)

*Primary Examiner* — Peter M Novak
(74) *Attorney, Agent, or Firm* — Klarquist Sparkman, LLP

(57) ABSTRACT

A circuit portion comprises a DCDC converter that provides current from an output to a plurality of loads. Channel logic circuitry is configured to provide current from the output of the converter to each load according to a cyclical sequence, wherein each cycle has a duration that is divided equally into a plurality of time slots. The channel logic circuitry is configured to provide current to each load for one or more discrete time slots. The number of time slots is greater than the number of loads so that at least two output loads receive current for different numbers of time slots in a cycle.

6 Claims, 3 Drawing Sheets

(56) References Cited

U.S. PATENT DOCUMENTS

2017/0373597 A1    12/2017  Kato et al.
2019/0199215 A1*   6/2019   Zhao ........................ G05F 1/62

OTHER PUBLICATIONS

Search Report under Section 17(5) for GB2016268.1, issued by the IPO on Mar. 25, 2021, 3 pages.
Search Report under Section 17(5) for GB2016283.0, issued by the IPO on Mar. 25, 2021, 3 pages.
Search Report under Section 17(5) for GB2016292.1, issued by the IPO on Mar. 25, 2021, 3 pages.

* cited by examiner

SINGLE-INPUT MULTIPLE-OUTPUT DCDC CONVERTERS WITH SEQUENTIAL OUTPUTS

CROSS-REFERENCE TO RELATED APPLICATION

This application claims priority to United Kingdom Patent Application No. 2016283.0, filed Oct. 14, 2020, which application is incorporated herein by reference in its entirety.

BACKGROUND OF THE INVENTION

The present invention relates to a single-input multiple-output (SIMO) DCDC converter.

Modern portable electronic devices are typically provided with a power source such as a battery that acts as a direct current (DC) power supply for the various electronic components within the device. However, typically these components will have different voltage requirements and so it is conventional for such devices to employ one or more DC-DC converters that step a nominal voltage associated with the power supply down to a voltage appropriate for the different electronic components. While this could be achieved by using a potential divider network (e.g. a series of resistors) to create a number of "taps" having different voltages, this is highly inefficient as energy is simply wasted as heat dissipated across the resistors.

One alternative arrangement known in the art per se is a buck converter. A buck converter circuit utilises an inductor-capacitor or "LC" circuit which is periodically connected to and disconnected from the power supply (e.g. by intermittently opening and closing a switch, typically implemented as a transistor referred to as the "high-side" (HS) transistor) by a driver in order to step down the voltage. This can be seen as an electrical equivalent to a mechanical flywheel, wherein energy is periodically input to the system to keep it outputting energy at a steady rate. The ratio of the output voltage to the input voltage can be adjusted by altering the duty cycle of a pulse width modulated (PWM) drive signal produced by the driver that is applied to the gate of the high-side transistor in order to open and close it.

A synchronous buck converter circuit replaces what is known as the "freewheeling" or "flyback" diode with a second transistor, often referred to as the "low-side" (LS) transistor. The driver then closes the low-side transistor when opening the high-side transistor and vice versa by applying appropriate PWM drive signals to the high- and low-side transistors to open and close them so as to intermittently couple the LC circuit to the input voltage. This improves the efficiency of the buck converter in exchange for increasing the bill of materials associated with the circuit. The efficiency of the DC-DC converter increases for increased output currents.

A buck converter may be implemented in a circuit, e.g. on a system-on-chip (SoC), and arranged to deliver power to multiple loads. In such systems, the power could be rotated asynchronously between the output loads in hysteretic mode (PFM). In this mode, power is supplied to each load on request. If none of the outputs request charge, the converter idles. Alternatively, PWM mode may be used, in which the supply of power may be rotated between each load in turn according to a fixed repeated sequence, such that the load switching is synchronised with a clock signal. Operating the converter in this mode allows a predictable switching noise spectrum to be achieved.

The coil inductance and the switching frequency are preset in order to achieve a certain output current capability per channel. The Applicant has appreciated that current systems are not ideal for supplying power to multiple loads, particularly when the power requirements of each load are unbalanced.

In order to avoid poor cross-regulation between output channels, current systems must be clocked at a low channel-switching frequency to allow the coil current to return to zero before the output switches to the next channel (i.e. Discontinuous Conduction Mode). Whilst approaches such as reducing the switching frequency may increase the output current, this increases the output voltage ripple, thus reducing the overall efficiency of the system. Lowering the inductance of the coil may also increase output current capability, but causes poor output voltage ripple and high peak currents.

The present invention seeks to provide an improved system for delivering power to a plurality of loads.

SUMMARY OF THE INVENTION

When viewed from a first aspect, the invention provides a circuit portion comprising:
- a DCDC converter arranged to provide current from an output of the converter to a plurality of output loads; and
- channel logic circuitry configured to provide current cyclically from the output of the converter to each of the plurality of output loads according to a sequence that is repeated for a plurality of cycles, wherein:
- each cycle has a cycle duration;
- the cycle duration is divided equally into a plurality of time slots;
- the channel logic circuitry is configured to provide current to each of the plurality of output loads for the duration of one or more discrete time slots; and
- the number of time slots is greater than the number of output loads so that at least two output loads receive current for different numbers of time slots in a cycle.

Thus, it will be appreciated that the present invention provides a circuit that is configured to direct the (non-zero) current output by a DCDC converter to a number of output loads in turn, according to a cyclic sequence. The cycle is divided into time slots of equal length, where each output load is provided with the current from the DCDC converter for the length of a discrete number of time slots.

The number of time slots is greater than the number of output loads. For an implementation comprising n output loads, the duration T of a cycle is divided into m time slots, each of length T/m, where m>n. The sequence is preferably defined such that a time between charge events for the particular output loads remains constant. This may be desirable when using an analogue PWM loop.

This means that at least one of the output loads is arranged to receive the output current for a total duration of more than one time slot per cycle. This allows one or more of the output loads to receive different proportions of the total current provided per cycle. Thus, in situations where the power requirements of each load are unbalanced (i.e., where one of the loads requires a higher current than the other loads), the sequence may deliver the output current in the required proportions. This allows the current to be distributed more efficiently.

For example, in an application of the present invention in a radio transceiver, a transmitter may use a large proportion of the load current during a transmission. Similarly, during reception of a signal, a receiver may use a large proportion of the load current. A circuit in accordance with an embodiment can enable the load current to be distributed between the transmitter and the receiver as required.

In some embodiments, the circuit is arranged on an integrated circuit, e.g. a system-on-chip (SoC). The DCDC converter may be a step-down (e.g. "Buck") converter. In some embodiments, the output of the DCDC converter is configured to be electrically connected to the output loads by a plurality of respective power rails.

In a set of embodiments the DCDC converter is configured to operate in discontinuous-conduction-mode (DCM), preferably exclusively. In many applications, it can be preferable to avoid continuous-conduction mode (CCM) in order to prevent poor cross-regulation between output loads. Embodiments of the present invention allow a higher current to be supplied to an output load without employing CCM.

The sequence may be such that one of the plurality of output loads is arranged to receive the current output from the converter for consecutive time slots. However, in some embodiments, the channel logic circuitry is configured to change which of the plurality of output loads receives the output current at each time slot transition such that a load receiving current for more than one time slot per cycle does so in separated time slots.

The circuit portion may comprise a clock having a period equal to the time slot duration.

The sequence may be predetermined—e.g. at the design or manufacturing stage or by a software application running on a device including the circuit portion. This means that, if a mode of operation is known in which one of the plurality of output loads requires a higher current, an appropriate sequence may be programmed during the design or manufacturing stage. This allows the efficiency of anticipated high-load scenarios to be greatly increased.

In some embodiments, the channel logic circuitry is configured to generate or to modify the sequence during operation of the circuit. The channel logic circuitry may be configured to select the sequence from a plurality of predetermined sequence options. The sequence may be selected according to operating characteristics (e.g. power consumption) of one or more of the plurality of output loads.

In a set of embodiments the circuit portion comprises a power monitor arranged to monitor loading of one or more of the plurality of output loads. The channel logic circuitry may be arranged to modify the sequence according to a signal received from the power monitor. The value of the signal received from the power monitor may depend upon the loading of one or more of the output loads. The sequence may be selected by the channel logic circuitry from a lookup table according to the value of the received signal. Modifying the sequence in dependence on the power consumption of one or more of the output loads allows the distribution of the load current to be efficiently managed during operation.

The circuit may further comprise a PWM module arranged to control the operation of the DCDC converter. The PWM module may be configured to control the DCDC converter depending on an output voltage required by one of the plurality of output loads. The PWM module may comprise duty control logic, configured to activate and deactivate the low side and high side switches of the DCDC converter. The duty control logic may be configured to activate and deactivate the low side and high side switches of the DCDC converter in accordance with a calculated duty cycle. The PWM module may be configured to calculate the duty cycle from a value of an input voltage, the value of the output voltage required by one of the plurality of output loads and the value of the load current. The circuit may comprise a dedicated PWM module for each of the plurality of output loads.

In some embodiments, the PWM module is configured to activate and deactivate the low side and high side switches of the DCDC converter such that the inductor of the DCDC converter is both charged and discharged within one time slot. In some embodiments, the PWM module is configured to activate and deactivate the low side and high side switches of the DCDC converter such that the inductor of the DCDC converter is charged and discharged no more than once per time slot.

BRIEF DESCRIPTION OF THE DRAWINGS

An embodiment of the invention will now be described, by way of non-limiting example only, with reference to the accompanying drawings in which.

DETAILED DESCRIPTION

Figure 1:
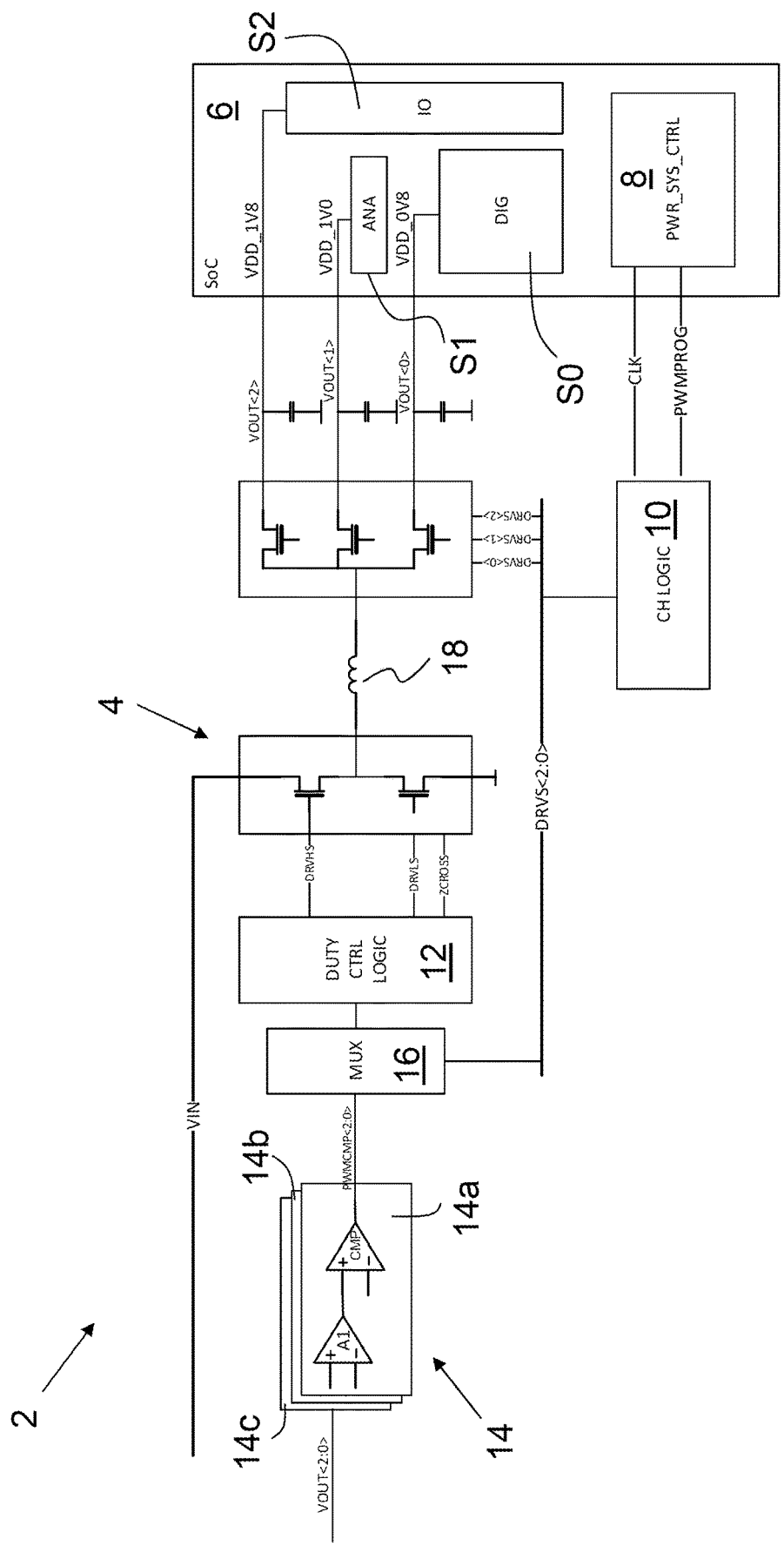
FIG. 1 is a schematic of a SIMO Buck converter in accordance with an embodiment of the present invention.

FIG. 1 shows a circuit 2 in accordance with an embodiment of the present invention. The circuit 2 is arranged on a system-on-chip (SoC) and comprises a single-input multiple-output (SIMO) step-down DCDC Buck converter 4 that receives an input voltage $V_{in}$ and provides a load current and load voltage $V_{out}$ to a domain 6. The domain 6 comprises three power channels that are independently electrically connected to the output of the Buck converter 4 to provide power to three loads S2, S1, S0 respectively. The domain 6 further comprises a power control module 8 arranged to monitor the respective power requirements of the loads S2, S1, S0 on the domain 6.

The circuit 2 further comprises channel logic circuitry 10 configured to rotate the supply of power output from the Buck DCDC converter 4 between the three power channels and, thus, between the respective loads S2, S1, S0 according to a repeated channel rotation sequence. The channel logic circuitry 10 receives a clock signal from the power control module 8, and is configured to switch the destination of the output of the Buck converter 4 between the output channels upon the active edge of the clock signal.

As will be described in more detail below, the power control module 8 of the domain 6 sends a sequence control signal to the channel logic circuitry 10 that depends on the loading of the components S2, S1, S0 of the domain 6. The sequence control signal defines the channel rotation sequence, i.e. the order in which current is to be supplied to the loads S0, S1, S2. The sequence is then repeated in a cyclical fashion, wherein each repetition is a single cycle. The channel logic circuitry 10 is configured to determine the channel rotation sequence from the sequence control signal based on a look-up table, an example of which is provided and will be described below.

The Buck converter 4 also comprises duty control logic circuitry 12 which receives digital PWM signals from a PWM unit 14 via a multiplexer 16. The PWM unit 14 comprises three PWM modules 14a-c, corresponding to the three output power channels. The PWM signals are used to instruct the duty control logic circuitry 12 to activate and deactivate the high side (HS) and low side (LS) switches of the Buck converter 4 in order to deliver the required output current to the loads S2, S1, S0.

The multiplexer 16 comprises a select input, which receives a channel selection signal from the channel logic circuitry 10, indicating which of the output channels is to receive the output current from the inductor 18 of the Buck converter, according to the channel rotation sequence. The multiplexer 16 forwards the PWM signal from the PWM module 14a-c that corresponds to the output channel indicated by the channel selection signal.

Operation of the circuit 2 shown in FIG. 1, with a hypothetical channel rotation sequence of 2-1-0, will now be described for reference purposes. According to this channel rotation sequence, the channel logic circuitry 10 would be configured simply to cycle through each output channel in turn, thereby allocating each output channel the length of a single clock period per sequence during which it is supplied by the output current of the Buck converter 4. Therefore, the current would be supplied to the load S2, followed by S1, followed by S0.

Figure 2:
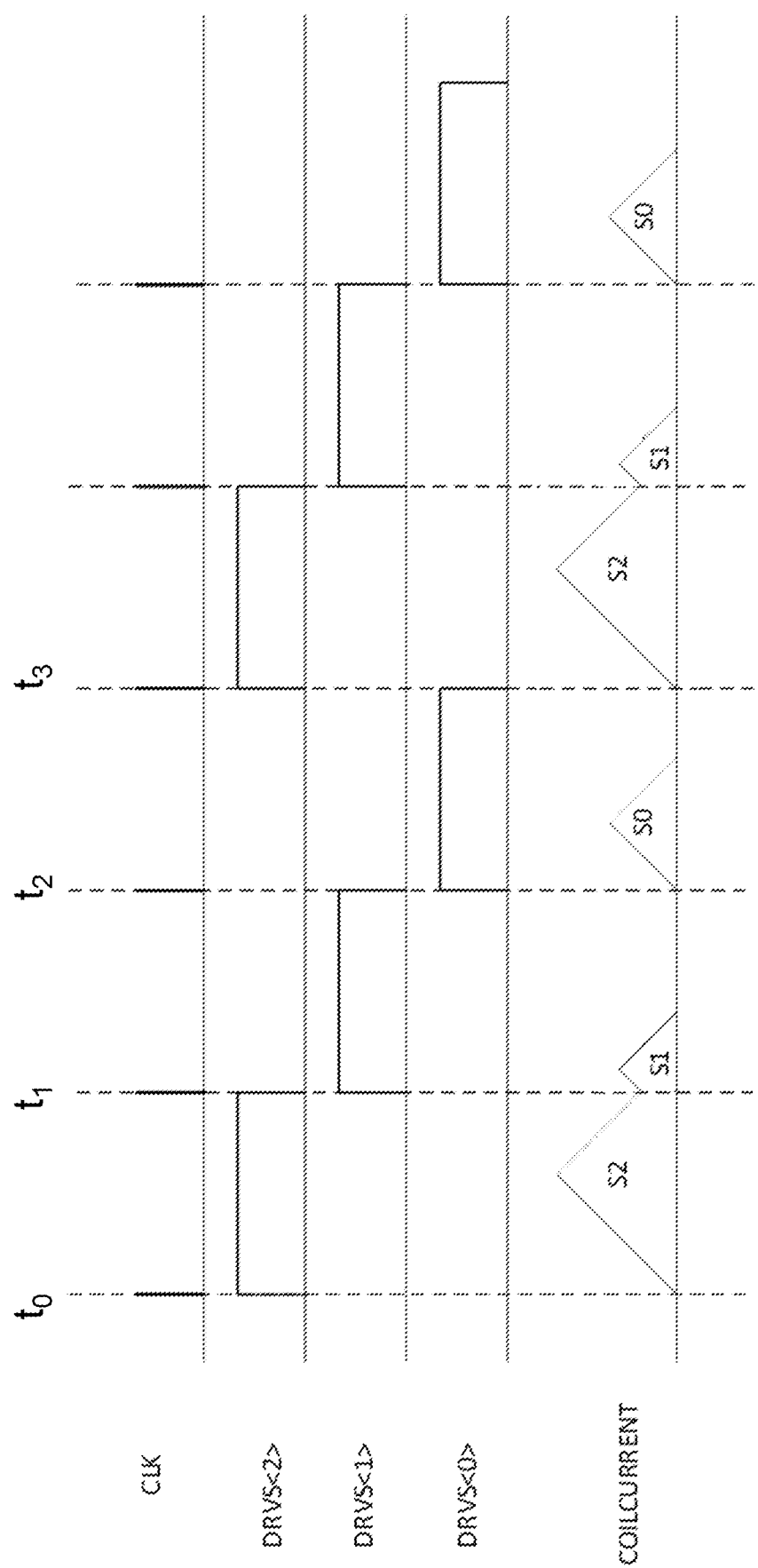
FIG. 2 is a graph of the outputs of the circuit shown in FIG. 1 operating with nominal output channel sequencing.

The output of the circuit 2 which would be provided according to such operation is shown in FIG. 2. FIG. 2 shows traces of the clock signal CLK, the channel selection signals DRVS<2>, DRVS<1>, DRVS<0> which would be produced by the channel logic circuitry 10 for each of the three output channels S2, S1, S0 respectively, and the current COILCURRENT which would be supplied to the loads S2, S1, S0 by the Buck converter 4. The clock signal CLK comprises a number of pulses, between which a clock period is defined. A logic high channel selection signal DRVS<2>, DRVS<1>, DRVS<0> indicates that the corresponding load S2, S1, S0 is arranged to receive the output current from the Buck converter 4.

During the first stage of the sequence (from $t_0$ to $t_1$), the channel logic circuitry 10 outputs a logic high DRVS<2>, in accordance with the nominal channel sequence 2-1-0, thereby indicating that load S2 is to receive the output current COILCURRENT from the Buck converter 4 for the duration of this clock period.

The PWM module 14a, corresponding to the load S2 issues PWM signals to instruct the duty control logic circuitry 12 to activate and deactivate the high side (HS) and low side (LS) switches of the Buck converter 4.

The inductor 18 of the Buck converter 4 is magnetised while the HS switch is activated (and the LS switch is deactivated). This is shown in FIG. 2 by the rising slope of the COILCURRENT trace for each clock cycle. The inductor 18 is demagnetised while the LS switch is activated (and the HS switch is deactivated). This is shown in FIG. 2 by the falling slope of the COILCURRENT trace for each clock cycle.

A single cycle of the Buck converter 4 comprises a coil magnetisation period (HS switch closed, LS switch open) followed by a coil demagnetisation period (LS transistor closed, HS transistor open). The coil is demagnetised until a trigger signal is received from a zero-cross comparator. The longer the coil magnetisation period, the greater the average output current that can be supplied by the Buck converter 4 to whichever of the loads S0, S1, S2 is active.

FIG. 2 shows that, between the times $t_0$ and $t_1$, the current supplied to load S2 reaches a peak and subsequently returns to zero just before the channel is switched by the channel selection signal DRVS<1> at time $t_1$. Importantly, the current does not reach zero before the arrival of the clock pulse at time $t_1$.

At time $t_1$, the clock pulse causes the channel logic circuitry 10 to instead output a logic high DRVS<1>, in accordance with the nominal channel sequence 2-1-0, thereby indicating that load S1 is to receive the output current from the Buck converter 4. Therefore, the current COILCURRENT is supplied to load S1 for the duration of this clock period (from $t_1$ to $t_2$).

It will be appreciated that the rate of charge $(v_{in}-v_{out}/L)$ and discharge $(v_{out}/L)$ of the inductor 18 (indicated by the gradient of the COILCURRENT trace) is not necessarily the same for each load S2, S1, S0. The current required by load S1 is much lower than that required by load S2. Therefore, the charge-discharge cycle of the Buck converter 4 is much shorter, meaning that the peak current received by S1 between $t_1$ and $t_2$ is lower than that received by S2 between $t_0$ and $t_1$. As a result, the current COILCURRENT returns to zero earlier in the clock period $t_1$ to $t_2$ than for the clock period $t_0$ to $t_1$.

At time $t_2$, the clock pulse causes the channel logic circuitry 10 to output a logic high signal DRVS<0>, in accordance with the nominal channel sequence 2-1-0, thereby indicating that load S0 is to receive the output current from the Buck converter 4. Therefore, the current COILCURRENT is supplied to load S0 for the duration of this clock period.

The current demanded by load S0 is higher than the current demanded by load S1, but not as high as the current demanded by load S2. As can be seen in FIG. 2, the current COILCURRENT returns to zero substantially before the next clock pulse at time $t_3$.

At time $t_3$, the channel logic circuitry 10 repeats the nominal channel sequence 2-1-0, and thus outputs a logic high signal DRVS<2>.

A Buck converter 4 may be operated in Discontinuous Conduction mode (DCM) or in Continuous Conduction Mode (CCM). In DCM, the current in the inductor 18 is zero at the active edge of the clock signal. That is, the charge-discharge cycle of the Buck converter 4 is shorter than the clock period. In CCM, the current in the inductor 18 is non-zero at the active edge of the clock signal, i.e. the current does not reduce to zero as the charge-discharge cycle of the Buck converter 4 is equal to or greater than the clock period. In applications comprising multiple load channels, it is desirable to avoid operating in CCM. This is because there is a risk of poor cross-regulation between the output channels, owing to residual charge in the inductor 18 when the output channel is rotated from one load to another.

When the Buck converter 4 is configured to supply the current COILCURRENT to loads S1 and S0 (i.e. for clock periods $t_1$ to $t_2$ and $t_2$ to $t_3$), it can be seen in FIG. 2 that the charge-discharge cycles of the Buck converter 4 are substantially shorter than the clock period. Therefore, when supplying current to loads S1 and S2, the Buck converter 4 is operating in DCM.

However, as discussed above, between the times $t_0$ and $t_1$, the current does not return to zero before the end of the clock period, as the full length of the clock period is required in order to deliver the output current required by load S2. Thus, the channel connecting the Buck converter 4 to the load S2 is fully utilised, meaning that the Buck converter 4 is operating at full load during this clock cycle ($t_0$ to $t_1$). Thus, when supplying current to the load S2, the Buck converter 4 is operating in CCM.

Therefore, it will be appreciated that, for this loading, CCM is not avoided by using the nominal 2-1-0 channel sequence.

Operation of the circuit of FIG. 1 according to a channel rotation sequence embodying the present invention will now be described.

In accordance with the present invention, the channel logic circuitry 10 is programmed to modify the channel rotation sequence in order to maximise the range of average output current that may be supplied to the load channels.

In an exemplary embodiment, the power control module 8 determines that the load S2 requires more current than can be supplied in DCM in one clock cycle, as shown in FIG. 2 and discussed above. The power control module 8 issues a sequence control signal which instructs the channel logic circuitry 10 to modify the channel sequence to 2-1-2-0.

Figure 3:
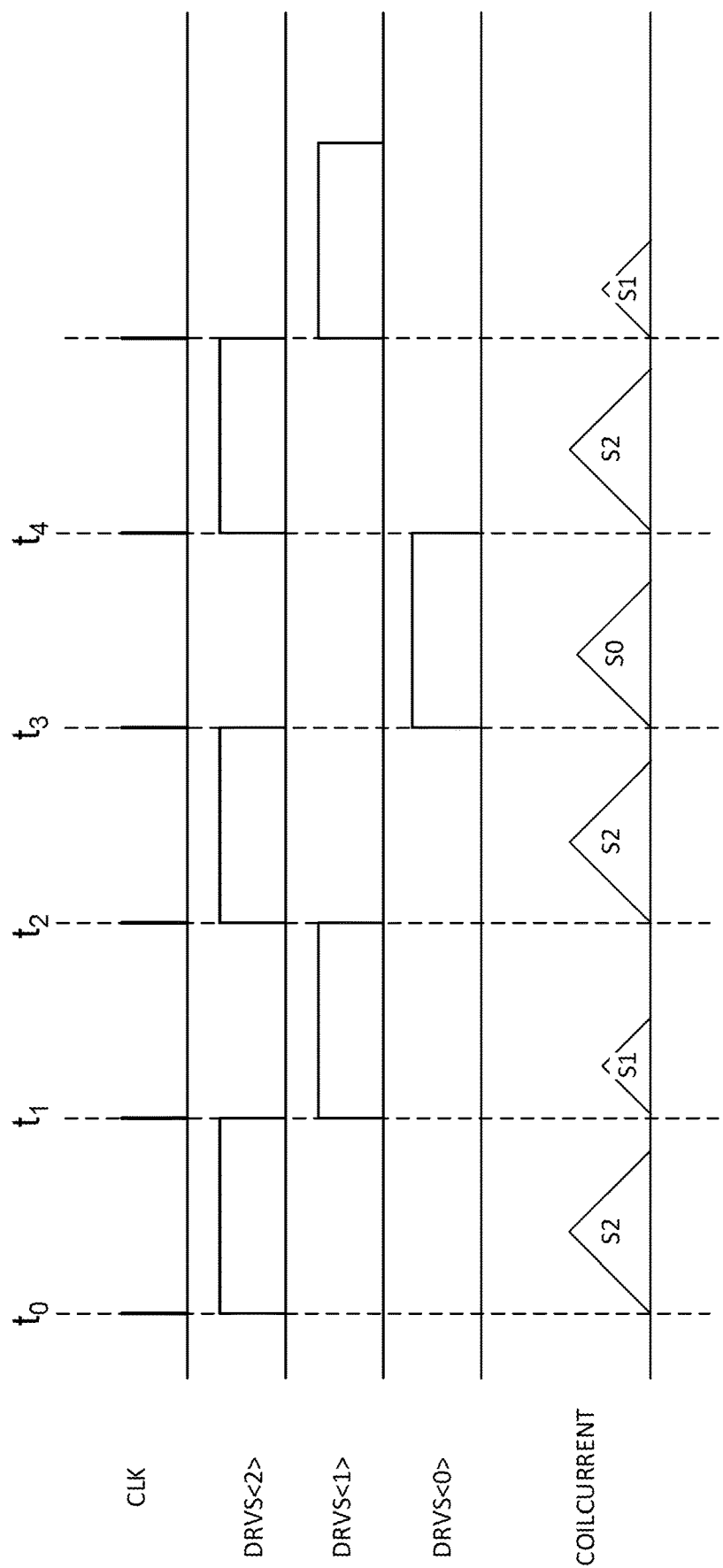
FIG. 3 is a graph of the outputs of the circuit shown in FIG. 1 operating with programmed channel sequencing according to an embodiment of the present invention.

FIG. 3 shows the traces of the components of the circuit 2 shown in FIG. 1, with the same output loading as for FIG. 2, but with the modified channel rotation sequence of 2-1-2-0.

The first channel DRVS<2> thus receives the output current COILCURRENT for the duration of two separate clock periods (from $t_0$ to $t_1$ and from $t_2$ to $t_3$) within one cycle of the sequence, thereby increasing the total time for which the first channel DRVS<2> is supplied with current from the Buck converter 4.

This allows the Buck converter 4 to supply a slightly reduced load current per clock period, which allows the current COILCURRENT in the inductor 18 to reduce to zero before the output channel is changed, thereby avoiding potentially detrimental operation in CCM.

In accordance with the present invention, the power control module 8 monitors the power requirements of each load S0, S1, S2 and, according to the power requirements, determines whether to issue a sequence control signal to the channel logic circuitry 10 to modify the channel sequence according to the loading demands of the output loads S0, S1, S2.

Exemplary sequence control signals are shown in the table below.

| Sequence Control Signal | Highest load | Channel sequence |
| --- | --- | --- |
| 00 | Equal | 2-1-0 (nominal) |
| 01 | S2 | 2-1-2-0 |
| 10 | S1 | 1-2-1-0 |
| 11 | S0 | 0-2-0-1 |

Thus, it will be seen by those skilled in the art that the embodiment described above provides a system that enables the sequence according to which current is provided to a plurality of loads from a DCDC converter to be adapted, thus enabling the current to be distributed more efficiently and facilitating operation entirely in DCM.

The invention claimed is:

1. A circuit portion comprising:
   a DCDC converter arranged to provide current from an output of the converter to a plurality of output loads;
   a power monitor arranged to monitor loading of one or more of the plurality of output loads; and
   channel logic circuitry configured to provide current cyclically from the output of the converter to each of the plurality of output loads according to a sequence that is repeated for a plurality of cycles, wherein:
   each cycle has a cycle duration;
   the cycle duration is divided equally into a plurality of discrete time slots;
   the channel logic circuitry is configured to provide current to each of the plurality of output loads during one or more of said discrete time slots; and
   the number of time slots is greater than the number of output loads, wherein the channel logic circuitry is configured to select the sequence, from a lookup table storing a plurality of predetermined sequence options, according to a value of a signal received from the power monitor; and
   wherein the lookup table stores at least:
      a first predetermined sequence option in which at least a first output load receives current for a different number of time slots in each cycle than a second output load; and
      a second predetermined sequence option in which at least a third output load receives current for a different number of time slots in each cycle than a fourth output loads.

2. The circuit portion of claim 1, wherein the DCDC converter is configured to operate in discontinuous-conduction-mode.

3. The circuit portion of claim 1, wherein the channel logic circuitry is configured to change which of the plurality of output loads receives the output current at each time slot transition.

4. The circuit portion of claim 1, wherein the circuit portion further comprises a pulse width modulation module arranged to control operation of the DCDC converter.

5. The circuit portion of claim 4, wherein the pulse width modulation module comprises duty control logic, configured to activate and deactivate low side and high side switches of the DCDC converter such that an inductor of the DCDC converter is both charged and discharged within one time slot.

6. The circuit portion of claim 5, wherein the pulse width modulation module is configured to activate and deactivate the low side and high side switches of the DCDC converter such that the inductor of the DCDC converter is charged and discharged no more than once per time slot.

* * * * *